No. 810,944. PATENTED JAN. 30, 1906.
J. E. HOPKINSON.
ELASTIC TIRE.
APPLICATION FILED AUG. 15, 1905.

Witnesses

Inventor
John E. Hopkinson
Attorneys

UNITED STATES PATENT OFFICE.

JOHN EBENEZER HOPKINSON, OF WEST DRAYTON, ENGLAND.

ELASTIC TIRE.

No. 810,944.

Specification of Letters Patent.

Patented Jan. 30, 1906.

Application filed August 15, 1905. Serial No. 274,348.

*To all whom it may concern:*

Be it known that I, JOHN EBENEZER HOPKINSON, manufacturer, a subject of the King of England, and a resident of West Drayton, in the county of Middlesex, England, have invented a certain new and useful Improvement in Elastic Tires for Road-Vehicles, of which the following is a full, clear, and exact description.

This invention relates to an improvement in that class of elastic tires in which the rubber is clamped in such a manner that it is forced radially inward of the wheel.

The invention consists in so shaping and forming the cheek-plates upon their internal faces that they assist the lateral compression caused by the flanges and tend to increase or accentuate the pressure of the rubber tire into the bed of the rim. I effect this by using a reëntrant flange with serrations upon the internal faces, these serrations entering into the tire and forcing it to take the desired position in the rim.

The invention is illustrated upon the accompanying drawings, in which—

Figure 1:
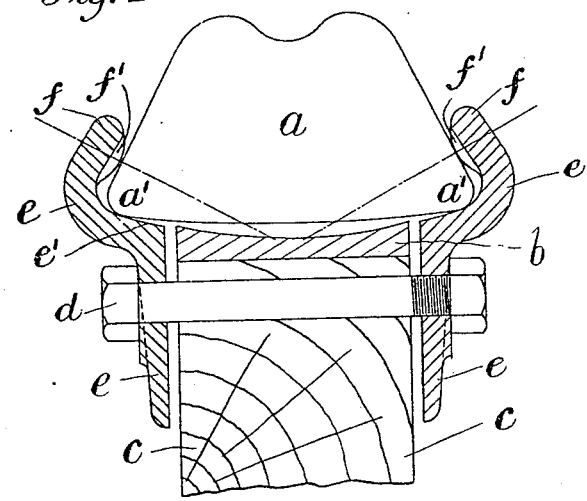
Figure 2:
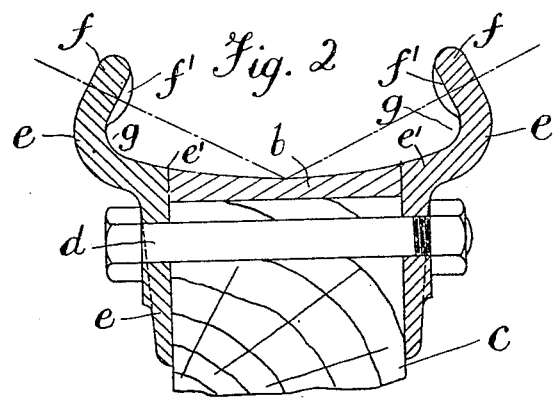
Figure 3:
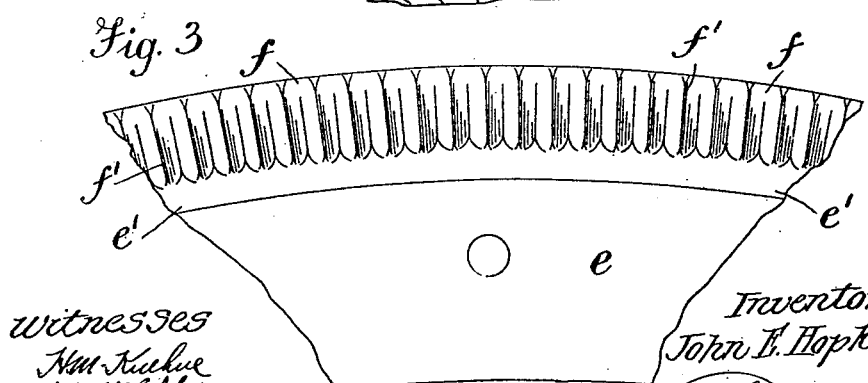

Figure 1 is a sectional elevation of a tire of the type described fitted with cheek-plates made according to this invention. Figs. 2 and 3 are detached views in cross-section and side elevation of the cheek-plate.

The tire $a$ is mounted upon a concave metal ring $b$, shrunk upon the felly $c$ of the wheel. Upon the sides of the felly are secured, by means of bolts $d$ or otherwise, cheek-plates $e$ $e$. These cheek-plates are shaped interiorly at $e'$ $e'$ to the concavity of the ring $b$ and are provided with reëntering-flanges $f f$ and undercut or recessed portions $g$. The bed of the rim for the tire is thus formed by the concave ring $b$ and the adjoining faces $e'$ $e'$ of the cheek-plates $e$, and the curve of this bed is more pronounced than the curve of the base of the tire $a$. The protuberances $a'$ at the base of the tire extend into the recesses $g$ of the flange-plates $e$ $e$. The cheek-plates are provided at $f'$ $f'$ with projections or serrations which are adapted to press into the tire.

This arrangement is of importance, since it affords a direct thrust from the point $f'$ into the central part of the bed of the rim. The lateral pressure which in this type of tire is brought to bear upon the rubber is now exerted through the teeth $f'$, which are set at such an angle that the resultant thrusts (indicated by the broken lines in Fig. 1) meet at about the center of the bed of the rim. As the bolts $d$ are being fastened or tightened up, the teeth $f'$ are the first part of the plate to bear upon the rubber, there being a slight clearance between the edge of the protuberance at the base of the rubber and the recessed portion $g$ of the plate. When the cheek-plates are finally in position, the serrations $f'$ prevent the rubber creeping around the rim.

Having thus described my invention, what I claim as such, and desire to secure by Letters Patent, is—

1. In a tire, the combination with a concave rim and a rubber tire extending across said rim, of cheek-plates adapted to compress the rubber laterally, of reëntering flanges upon the cheek-plates and of serrations upon the inner faces of the flanges arranged to thrust the tire into the concave rim.

2. In a tire, the combination with a concaved rim and a rubber tire having a flatter base than the rim, of cheek-plates having reëntering flanges and of serrations upon the interior faces of the flanges which bite into the sides of the rubber tire.

3. In a tire, the combination with a felly, a concaved ring mounted on the felly, and a rubber tire having a base of less curvature than the rim, of cheek-plates secured upon the sides of the felly, undercut recesses upon the inner sides of said cheek-plates, reëntering flanges at the peripheries of said cheek-plates and serrations upon the inner sides of the flanges, adapted to press into the rubber tire.

4. In a tire of the class described, cheek-plates having reëntering flanges fitted with serrations adapted to force the tire into its rim.

In witness whereof I have hereunto set my hand in the presence of two witnesses.

JOHN EBENEZER HOPKINSON.

Witnesses:
VICTOR F. FEENY,
CYRIL J. FEENY.